March 28, 1961 H. N. HOMEYER ET AL Re. 24,953

CHEMICALLY RESISTANT PRESSURE-SENSITIVE ADHESIVE TAPE AND METHOD OF MAKING THE SAME

Original Filed Nov. 22, 1954

INVENTORS

Henry N. Homeyer and

John J. McCarthy

BY Roskelly & Bartholomew

ATTORNEYS

United States Patent Office

Re. 24,953
Reissued Mar. 28, 1961

24,953

CHEMICALLY RESISTANT PRESSURE-SENSITIVE ADHESIVE TAPE AND METHOD OF MAKING THE SAME

Henry N. Homeyer, Milford, and John J. McCarthy, New Haven, Conn., assignors to Connecticut Hard Rubber Company, New Haven, Conn., a corporation of Connecticut Original No. 2,824,026, dated Feb. 18, 1958, Ser. No. 470,533, Nov. 22, 1954. Application for reissue Mar. 7, 1958, Ser. No. 719,985

18 Claims. (Cl. 117—122)

Matter enclosed in heavy brackets [ ] appears in the original patent but forms no part of this reissue specification; matter printed in italics indicates the additions made by reissue.

This invention relates to pressure-sensitive adhesive films and more particularly pressure-sensitive films having superior properties under conditions which are usually harmful to ordinary pressure-sensitive tapes such as the action of chemicals, and temperature change. These adhesive films and tapes formed thereof, retain their adhesive characteristics and electrical resistance under severe climatic conditions.

The problem of providing a halogenated polyethylene coating for the surface of various objects has been greatly hindered by their non-adherence characteristics. Methods have been developed whereby small discrete particles of halogenated polyethylene are deposited on a surface and then the entire article is heated to a high temperature, about 480° F. in the case of polytrifluorochloroethylene and 750° F. in the case of polytetrafluoroethylene.

This has proven to be a severe hindrance since a great many articles are damaged by exposure to such temperatures.

Various attempts to coat articles at room temperature have all led to failure. Another object of this invention is to provide a convenient, readily usable method for modifying the surface of an article by providing a pressure-sensitive adhesive coating for a film of halogenated polyethylene firmly bonded to the halogenated polyethylene which will allow attachment of the finished adhesive tape without the use of heat or solvents with great rapidity.

One example of the utility of such a means of modifying outer surfaces is in the case of heat sealing equipment. The thermoplastic materials which are heat sealed transfer onto the hot surface and cause mulfunctioning of the equipment. The Teflon surface modification completely overcomes this problem.

Halogenated polyethylene plastics are known to possess a high degree of resistance to severe climatic conditions over a wide temperature range, to be nonwetting, and to have a high degree of chemical inertness and retention of electrical resistance under severe conditions in addition to other desirable properties. Typical examples of halogenated polyethylene plastics are Teflon, a polytetrafluoroethylene polymer manufactured by the Du Pont Company and Kel-F, a polytrifluorochloroethylene polymer made by the M. W. Kellogg Company, and Fluorothene by Union Carbide and Carbon Corporation.

The very attributes of halogenated polyethylenes, which strongly contribute to their nonwetting and highly resistant characteristics, likewise render such materials substantially nonreceptive to adhesive compositions in general and particularly to adhesive compositions of the pressure-sensitive type. For these reasons protective coverings of halogenated polyethylene plastics have heretofore been applied to articles such as electrical insulators by fastening or tying tapes of halogenated polyethylene around the articles with binders of Fiberglas and similar materials, to position the plastic tapes on to the elements being insulated. In addition to being tedious and time-consuming, it is readily understood that such methods do not provide the degree of intimate adherence often desired between the coverings and in articles being protected or insulated.

The object of this invention is to overcome these limitations by providing a firmly bonded pressure-sensitive coating for a film of halogenated polyethylene, which exhibits a degree of differential adhesion between the halogenated polyethylene film and any other surface to which it may be applied.

An additional object of the invention is to produce pressure-sensitive adhesive tapes and films having a high degree of chemical and thermal resistance. Pressure-sensitive adhesive tapes of the known variety ordinarily include a backing and a coating of a tacky composition having a strong affinity to the base material so that the adhesive remains more firmly attached to the backing than to the opposite face of the tape which it contacts when the tape is formed in a roll. Halogenated polyethylenes, although desirably possessing chemical and temperature resistance to a high degree, are difficultly wetted and not readily receptive to any known pressure-sensitive adhesive compositions which must adhere more firmly to the base than to the backing or other surfaces.

A further important objective of the present invention is to provide highly temperature-resistant pressure-sensitive adhesive films having the pressure-sensitive adhesive component firmly anchored to one face of the base material at all times, and which remains substantially less adherent to the other side of the backing even when firmly pressed thereagainst over extended periods of time such as obtained when the material is formed in a roll.

Another object of the invention is to provide a pressure-sensitive adhesive firmly adhered to a halogenated polyethylene backing and wherein the pressure-sensitive properties of the adhesive and its adherence to the backing are relatively unaffected by exposure to water, hydrocarbon oils and other chemicals.

Another object of the invention is to provide a pressure-sensitive tape which retains its useful properties over wide temperature ranges and extreme climatic conditions.

Other objects and advantages will become apparent from the ensuing description and accompanying claims.

Figure 1:
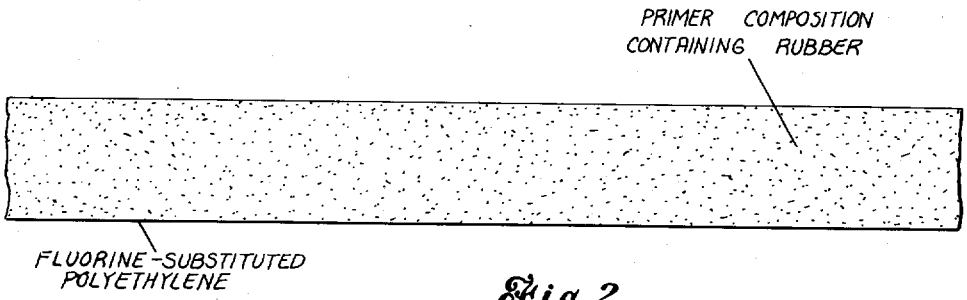
Figure 1 is a plan view of the fusion modified halogenated polyethylene film.
Figure 2:
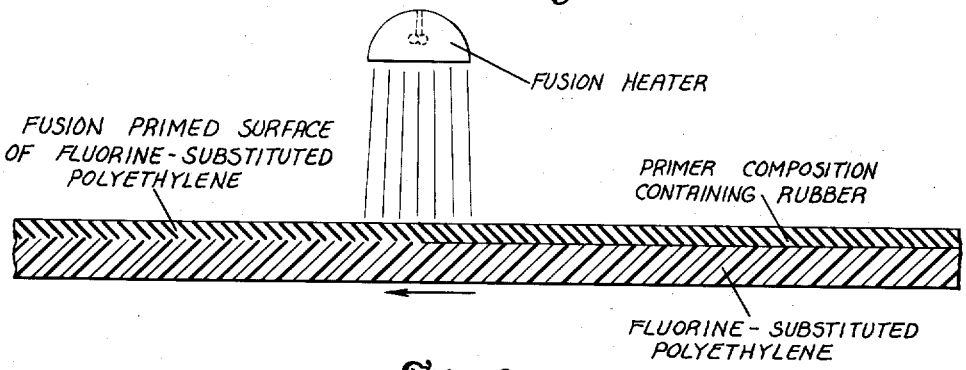
Figure 2 is a cross-sectional view of the fusion modified halogenated polyethylene film illustrating the application of heat.
Figure 3:
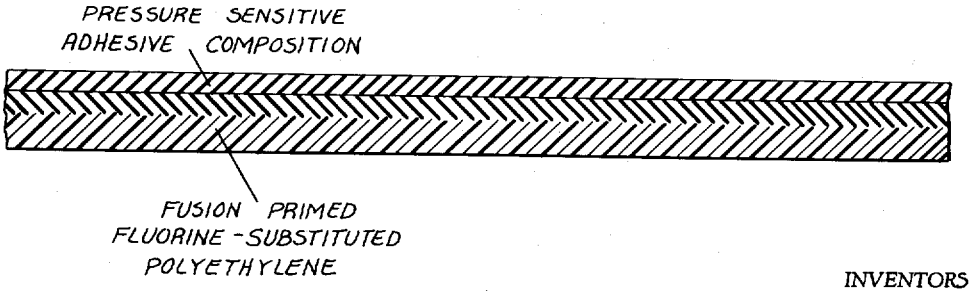
Figure 3 is a cross-sectional view of the completed pressure-sensitive adhesive tape showing a pressure-sensitive adhesive layer and the fusion primed surface.

The films which are the subject of the present invention comprise as base materials halogenated polyethylene plastics having superimposed thereon a temperature-resistant pressure-sensitive adhesive which has the novel characteristic that the adhesive will become firmly attached to practically any surface with the application of slight pressure and yet will not adhere to the back of the tape when coiled in a roll sufficiently to strip the adhesive layer off the backing.

It has been found that pressure-sensitive adhesive films having exceptional resistance to extreme temperatures and weathering and other desirable properties may be formed from a specially primed halogenated polyethylene base and a tackified silicone rubber compound. Laminated structures including primed fluorinated polyethylene plastics are described in Panagrossi and Hauser applications Serial Nos. 246,448 and 318,442, *both now abandoned.* We have discovered that the normally resistant halogenated polyethylene plastic may be rendered exceptionally receptive to various heat and weather-resistant pressure-sensitive silicone rubber adhesives by the prior application of a priming coat of an elastomeric compound, preferably silicone rubber, to the halogenated polyethylene heated to the fusion or softening temperature of the plastic base. The elastomeric primer may, if desired, be mixed with a dispersion of halogenated polyethylene plastic, as described in the referred to applications, applied to the basic film and the combination heated to the softening point of the halogenated polyethylene support. Thereafter, a suitable pressure-sensitive adhesive composition is spread onto the primed surfaces and heated or cured thereon whereby the pressure-sensitive component becomes more firmly attached to the base than adjacent surfaces to which it may be applied.

According to the present invention, a tape of halogenated polyethylene plastic may be given a priming treatment on one face, according to the teachings of the co-pending U.S. applications, Serial Nos. 246,448 and 318,442 both now abandoned, for example. This treatment, in general, consists in the application of a solution of a suitable elastomer, such as a silicone rubber, followed by heating the coated surface of the tape to the softening or fusion temperature of the halogenated polyethylene support.

In accordance with a preferred embodiment of the invention, the face of the halogenated polyethylene film which is to receive the pressure-sensitive adhesive is coated or spread with a thin layer of a solution containing silicone rubber, and the coated silicone rubber surface of the film then heat-treated to the softening or fusion temperature of the fluorinated polyethylene to cause the silicone rubber to integrate with the surface of the tape. The primed and treated film is thereafter provided with a thin coating of a pressure-sensitive silicone rubber composition, and the coated tape then heat-treated, cured and slit, if desired.

According to the invention, it is found that the heat-treated silicone rubber adhesive layer has become firmly attached to the underlying primed halogenated polyethylene tape and when the tape is rolled there is substantially greater adherence between the adhesive layer and the primed surface of the tape. In tests carried out with respect to the tape in accordance with the foregoing procedure, it was found that the composite tape retains its pressure-sensitive and insulating properties over a temperature range of from about —80° F. to about [—]500° F.

In a further aspect, the invention contemplates the preparation of a silicone rubber containing pressure-sensitive adhesive compositions having the desired affinity for the fused rubber halogenated polyethylene surface of the tape and which retains substantial tack on the outer surface indefinitely.

The invention is applicable in general to halogenated polyethylene base materials which exhibit a high degree of resistance to wetting and chemical action. These materials are solid polymerization products of ethylene with halogens including fluorine, bromine, chlorine and iodine.

The preferred pressure-sensitive adhesive according to the present invention is a tackified silicone polymer which retains its tackiness over a wide range of conditions. Said silicone rubber pressure-sensitive adhesives having suitable characteristics for purposes of the invention are manufactured by Dow Corning Company as XC–269 and XC–271. These adhesives are silicon rubber compositions having the following characteristics:

| | |
|---|---|
| Approximate molecular weight | 573,000. |
| Solids content, percent | 40. |
| Viscosity at 25° C., centipoises | 1000–3000. |
| Flash point, ° F. | 60–75. |
| Weight loss, percent, 3 hrs. at 250° C. | 8. |
| Specific gravity | 0.94. |
| Shipping weight, pounds per gal. | 7.5. |
| Solvent | Xylene. |
| Thinners | Heptane, xylene, toluene or other aromatic hydrocarbon solvents. |

The adhesive XC–271 differs from XC–269 by the inclusion of a catalyst such as lead ocotate that serves to accelerate the curing of the adhesive material following application to the rubber-primed fluorinated ethylene plastic tape. These adhesives are described and claimed in the John F. Dexter Patent 2,736,721, issued February 28, 1956, and assigned to Dow-Corning Corporation of Midland, Michigan.

According to the invention, a pressure-sensitive silicone rubber adhesive may be prepared if desired from a mixture of a suitable silicone oil such as a dimethyl silicone oil, oxidized to the resinous stage, and a solution of a cured or uncured silicone elastomer. The oxidized silicone oil functions to impart tackiness to the composition while the incorporation of silicone rubber acts to impart body and strength to the finished adhesive composition. Fluidity of the pressure-sensitive adhesive can be further controlled by the addition of diatomaceous silica and similar materials. A silicone rubber should be defined as one having a ratio of methyl, phenyl or other groups to silicone atoms more than 1.0 and less than 2.0.

The oil and rubber (and the proportions in which they are blended) may be selected with regard to their molecular weights in order to modify the tackiness and other properties, as desired, for particular applications. Also the curing agent and pigment, if employed, and the time and temperature of the cure may be varied in order to produce a pressure-sensitive adhesive having the most desirable qualities. For example, if an oil with too low a molecular weight is selected, it will tend to become volatile at temperatures between 400° and 500° F., which is undesirable. Likewise, if the rubber selected is too low in molecular weight it may produce an adhesive which is too weak or one which will require too large a proportion of the curing agent to strengthen it. This would be objectionable because it would reduce the tackiness of the surface. Rubbers having a molecular weight of from 500,000 to a million and a viscosity of around 1000 cps. are suitable for purposes of the invention. For example, a suitable adhesive has been prepared from mixtures of equal parts of an oxidized silicone oil SF–96 of 1000 cps. viscosity and SE–76 silicone gum having a molecular weight of 500,000.

After the mixture of ingredients is completed, as described above, the composition should be approximately the consistency of honey. It can then be spread upon the surface of the primed tape or backing material in any preferred way such as by means of a knife-coating device. The knife may be lowered toward the backing material so that the distance between the latter and the knife is exactly that desired for the thickness of the adhesive. From the coating knife the coated film passes to a heating chamber in which it may be heated for approximately one-half hour at a temperature from 300° to 350° F., the time and the temperature for curing being dependent upon the type of curing agent and the proportions of the various ingredients in the composition.

After being cured in this manner the tape which consists of the primed backing material with the adhesive applied thereto may be then rolled into rolls of the desired length and cut into tapes or strips of the desired width. The tape is then used in the ordinary manner of pressure-sensitive tapes by being merely unrolled from the supply roll and pressed against the surface to which it is desired that it adhere. The tape may be employed for many different purposes as are pressure-sensitive tapes at the present time. It will, however, be particularly useful where it is exposed to conditions of temperatures either very low or very high, and also where it is subject to conditions of service where other materials are unstable or inapplicable. While temperatures as low as −100° F. or as high as 500° F. have been mentioned as temperatures which would not affect the usefulness of the adhesive, it will be understood that these temperatures are not the lower and upper limits of temperature between which the material will be useful. It has been found that the adhesive will not lose its adhesive qualtities even though exposed to lower and higher temperatures than those named.

EXAMPLE I

Preparation of pressure-sensitive adhesive

The starting material can be either a stopped or unstopped silicone oil with a viscosity preferably less than 1000 cps. A stopped oil is one in which monofunctional monmers have been added to stop the linear polymerization at a desired point or viscosity. This, in effect, limits the molecular weight of the oil and prohibits additional polymerization through the normal means. Unstopped or polymerizable silicone oils can be used, but the actual operation and handling of this class present numerous difficulties when the temperature of the reaction is raised to over 200° C.

A quantity of G.E. SF–96 stopped dimethyl silicone oil of 1000 cps. viscosity was measured and poured into a three-neck flask or resin pot. The flask was fitted with a stirrer, a thermometer and an air-inlet tube which extends well below the level of the liquid. In addition, an efficient water-cooled condenser and a Dry-Ice condenser were fitted to the flask in order to reduce the amount of oil lost in the reaction due to entrainment in the gas which was blown through. Several drops of phosphoric acid were added while the oil was being well stirred. Several minutes were allowed for the acid to mix in with the oil. The air was then turned on and allowed to bubble rather rapidly through the oil. The temperature of the reaction was then raised to approximately 200° C. The reaction proceeded at a temperature above 170° C., and with increasing rapidity at higher temperatures. The reaction was carried out for 12 hours at 200–220° C. with little change in appearance of the oil. As the reaction passes into the second stage, slight increases in viscosity were noticed, and a white smoky gas was evolved from the reaction. As the reaction proceeds further, the volume of this gas increased, accompanied by increasing viscosity of the oil in the flask. This stage required about two hours. At the end of this stage, the viscosity of the oil increased very rapidly. When the product was in the form of a gum, the reaction was stopped. The gum was removed from the flask and dissolved in xylene in approximately a 60% composition.

A dimethyl silicone polymer gum such as General Electric Co.'s SE–76 was modified by heating fifteen minutes at 480° F. and mixed with an equal amount of the oxidized silicone oil dispersed in xylene and the mixture placed in a mixer such as a Waring Blendor and subjected to vigorous agitation for a period of approximately fifteen minutes.

Priming of halogenated polyethylene

The surface of a "Teflon" polytetrafluoroethylene film was primed and prepared by spreading over the surface of the tape a liquid silicone rubber composition. The silcone rubber composition was prepared from C–251 cement, titanium dioxide filler and having a specific gravity of 1.49. A coating composition having the approximate consistency of house paint was obtained by mixing 1000 grams of C–251 cement in 1200 grams of carbon tetrachloride.

C–251 cement is a silicone rubber composition of The Connecticut Hard Rubber Company, known also as Cohrlastic–251, having approximately the following composition:

100 parts silicone gum SF–69 (General Electric Co.'s), viscosity 2600 cps.
0.2 part ferric chloride.
120 part titanium dioxide.
0.2 part stearic acid.
12 parts benzoyl peroxide.

A composition was formulated by adding the ferric chloride slowly to the silicone gum at a temperature of 70° C., the temperature raised to 125° C. and held until the viscosity reaches approximately 2000 cps., which takes about thirty minutes. The titanium dioxide was then added and the mixture heated at the same temperature for an additional thirty minutes, then cooled and the benzoyl peroxide added.

A thin film of the silicone rubber cement was sprayed onto the surface of the polytetrafluoroethylene tape and allowed to dry at room temperature. The silicone rubber-coated tape was then introduced into a continuous 10 foot oven at the rate of 25 feet per hour, heated to a temperature of approximately 725° F. This temperature was found to sufficiently soften or fuse the surface of the Teflon plastic to integrate or interfuse the silicone rubber coating with the surface of the tape.

Application of the pressure-sensitive adhesive

The film was then allowed to cool to room temperature and the pressure-sensitive adhesive prepared as described above, applied to the prime surface by 2-roll coater having a fixed gap between the coating rolls. The coated film was then passed into a heating chamber having an oven temperature of 180 to 350° F. and the film then withdrawn from the oven and formed into rolls, and slit.

When tested, it was found that the pressure-sensitive layer on the surface of the primed Teflon film had a substantial degree of tackiness and the tape retained a tacky condition indefinitely. The tackiness of the material can be tested by a tack tester consisting of a five-eighths diameter steel ball which rolls down an inclined 45° plane, and it was found to roll only one-half inch after striking the bite of the tape. The adhesion of the pressure-sensitive layer to the primed Teflon backing was confirmed by rapidly unwinding the roll whereupon it was found that the layer of pressure-sensitive adhesive remained firmly adherent to the primed surface of the Teflon tape and substantially none of the adhesive was adhered to the opposite face of the backing.

EXAMPLE II

An extended length of Teflon polytetrafluoroethylene tape was provided with a silicone rubber-primed surface, as described in the previous example. A dimethyl silicone rubber pressure-sensitive adhesive composition manufactured by Dow Corning as XC–269 was applied to the primed surface of the Teflon adhesive tape. The adhesive material was applied by a roll coater having a gap set of 0.021 inch and the finished thickness of the coating was .006–.007 inch. The base film has a thickness of .0035–.004 inch. The tape was then passed into a curing oven and heated under the same conditions described in the preceding example. When tested, it was found that the adhesion of the pressure-sensitive adhesive to the primed tape was approximately sixty-nine ozs. per inch. The adhesion of a similar adhesive to an unprimed Teflon polytetrafluoroethylene tape amounted to approximately thirty to thirty-four ozs. per inch. Thus it can be seen that an increased differential adhesion of 35–39 oz. is obtained by the use of the primer.

EXAMPLE III

A similar procedure as in Example II was followed using Dow Corning adhesive XC–271 in place of XC–269 with comparably successful results.

EXAMPLE IV

A primed "Teflon" tape was prepared in accordance with Example I. A silicone polymer gum SE–76 was heated for fifteen minutes at 480° F. becoming partially oxidized and then spread on the rubber-primed surface of the Teflon tape, and the coated tape heated in the curing oven. The adhesive surface of the tape showed considerable tack and was firmly adhered to the Teflon backing.

EXAMPLE V

Priming of surface

A paste was prepared from 173.7 grams of a dispersion of polytrifluorochloroethylene (Kel-F) particles in xylene, the dispersion containing approximately 20% solids whose particle size was approximately 0.1 to 3.0 microns, with 48 grams of silicone adhesive. The particular silicone adhesive employed was a silicone rubber compound having as one component a polysiloxane, which is essentially a dimethyl silicone polymer (G.E. SF–69) containing also a suitable filler such as titanium dioxide, and a curing agent, for example, benzoyl peroxide. The specific gravity of the resulting composition is 1.49. After stirring the mixture of silicone adhesive and "Kel-F" particles to insure uniformity, a small amount of the paste was brushed onto a narrow strip or tape of "Kel-F". The coated sheet was then placed on an aluminum screen in an oven provided with air circulation and held at 450° F. for fifteen minutes. When cooled to room temperature, the sheet had shrunk slightly, but otherwise its physical properties appeared to be unchanged. The surface coating, about 0.002 inch thick, was found to be fused so tightly to the sheet that it could not be scraped off.

Application of adhesive 100 parts of SE–76 (General Electric) dimethyl silicone rubber, approximate molecular weight of 500,000, is heated for four hours at 480° F. and then cooled to room temperature. This composition is then mixed with 100 parts of SR–28 (General Electric) silicone resin, 100 parts of Dow Corning silicone resin 935 and six parts of benzoyl peroxide. The resulting mixture is spread on the primed "Kel-F" backing and heat-cured for 90 minutes at a temperature of 300° F., producing a highly resistant tape wherein the adhesive was firmly adhered to the tape.

EXAMPLE VI

A strip of polytrifluorochloroethylene (Kel-F) tape was primed by heating the tape and coating with a silicone rubber solution as described in Example I.

A silicone rubber pressure-sensitive adhesive composition was prepared by heating 100 parts SE–76 silicone rubber for four hours at 480° F., followed by cooling to room temperature. This compound was then thoroughly mixed with 100 parts of a silicone resin SR–28 (G.E.) and the resulting mixture spread on the primed Kel-F backing to form a pressure-sensitive temperature-resistant adhesive tape. When tested, the silicone rubber pressure-sensitive adhesive layer was found to be strongly adhered to the primed polytrifluorochloroethylene and to retain its pressure-sensitive adhesive qualities at temperatures of from —80° to [—]500° F.

EXAMPLE VII 100 parts of silicone rubber compound SE–76 (G.E.) was heat-treated at a temperature above 400° F. and allowed to cool. Thereafter, the material was mixed with 100 parts of DC–935 (Dow Corning), an oxidized silicone oil and six parts of benzoyl peroxide.

A fluorinated polyethylene tape (Kel-F) prepared with a fused silicone primer, as described in Example I, was coated with the pressure-sensitive silicone rubber composition and heat-cured at a temperature of 300° F. The coating was found to be remarkably adherent to the backing and to have pressure-sensitive properties.

EXAMPLE VIII

A tape formed of polytetrafluoroethylene (Teflon) was coated with a thin coating of a paste prepared from 173 grams of a dispersion of "Teflon" particles in xylene and 48 grams of C–251 cement. The paste was brushed onto the Teflon tape and the coated surface heated to a temperature of about 750° F. for fifteen minutes to produce a primed surface.

The primed polytetrafluoroethylene tape was given a thin coat of a pressure-sensitive silicone rubber adhesive sold under the designation XC–269 by Dow Corning. The coated tape was then further heated in an oven at a temperature of about 350° F. and cooled to room temperature.

When tested, the pressure-sensitive adhesive layer was found to be firmly adhered to the Teflon backing so that when formed in a roll and unwound, the adhesive layer did not stick to the backing.

EXAMPLE IX

A polytetrafluoroethylene tape was primed by fusing the surface with a coating of a dispersion of Teflon and silicone rubber particles, as described in the preceding example.

After cooling, the primed surface of the Teflon tape was provided with a thin coating of a viscous liquid of pressure-sensitive adhesive XC–271. This adhesive composition contained a vulcanizing agent and a filler. The coated tape was heat-treated in an oven at 350° F. for a period of about twenty minutes whereby the pressure-sensitive silicone adhesive was cured and firmly anchored onto the surface of the primed Teflon tape.

When tested, this pressure-sensitive adhesive tape was found remarkably suitable for electrical insulation work and resistant to chemicals and drastic temperatures.

EXAMPLE X 100 grams of C–251 cement was applied by brushing on one surface of a polytetrafluoroethylene tape and the coated tape heated in an oven to 750° F. for a period of about twelve minutes.

The tape was allowed to cool to room temperature and given a coating of a viscous solution of silicone rubber prepared by heating a silicone rubber solution to a temperature of about 480° F., as in the preceding example. It was found that a pressure-sensitive adhesive layer of the silicone rubber was firmly adhered to the Teflon underlayer and the adhesive retained its pressure-sensitive characteristics over a substantial temperature range.

EXAMPLE XI

A polytetrafluoroethylene tape was primed by coating the surface of the tape with a coating of a natural rubber solution formed by dissolving 2.5 grams of 20% solution of natural rubber in benzene and the rubber layer dried at room temperature. The primed strip was then placed on an aluminum screen in a radiant heated oven at a temperature of 715° F. for three minutes to fuse the rubber layer into the surface of the support.

The treated primed surface was cleaned of loose carbon and provided with a coating of a natural rubber pressure-sensitive adhesive composition.

The pressure-sensitive adhesive layer was firmly attached to the primed Teflon support and displayed high-tensile strength, and could be rolled without the use of a slipsheet and unrolled without the adhesive layer sticking to the opposite face of the backing.

EXAMPLE XII

The surface of a polytetrafluoroethylene tape was primed essentially as described in the preceding example.

A natural rubber-based pressure-sensitive adhesive was formed by compounding together in a mixing mill the following ingredients:

| | Parts |
|---|---|
| Bare crepe (natural) rubber | 100 |
| Zinc oxide | 100 |
| Hydrogenated rosin | 60 |
| Heptane volatile solvent | 45 |
| Antioxidant Flectol B (a condensation product of aniline and acetone of Monsanto Chemical Co.) | 1.5 |

A thin layer of the natural rubber pressure-sensitive composition was applied to the primed surface of the Teflon tape and passed through a heating chamber of an oven temperature of 180 to 135° F. to cure and dry the adhesive layer. The tape was then withdrawn and formed into rolls.

The pressure-sensitive adhesive layer was found to be firmly adhered to the primed Teflon tape.

EXAMPLE XIII

A natural rubber pressure-sensitive adhesive prepared in accordance with Example XII was brushed onto a sample of Teflon tape having the surface to which the composition was applied primed with a natural rubber solution substantially as described in Example XI. The adherence of the natural rubber adhesive layer was found to be good and did not readily adhere to the backing when the material was formed into a roll.

EXAMPLE XIV

A primed surface of Teflon tape was formed by brushing a solution of 14.5% "Butyl" rubber in benzene and drying the resulting coating at room temperature. The coated surface of the Teflon tape was then subjected to a temperature of 715° F. in a radiant-heat oven for a period of three minutes to fuse the Butyl rubber composition into the surface of the polytetrafluorethylene tape. A pressure-sensitive adhesive composition was applied to the modified surface of the tape in exactly the manner described in Example XII. It was found that the adherence of the pressure-sensitive layer to the primed surface of the tape was excellent when subjected to tests.

EXAMPLE XV

A Vistanex-based pressure-sensitive adhesive and the following composition was formulated:

| | Parts by weight |
|---|---|
| Vistanex (polyisobutylene molecular weight 80,000) | 100 |
| Vistac (polyisobutylene molecular weight 14,000) | 100 |
| Soft cumarone indene resin | 40 |
| Heptane | 800 |

The resulting composition was brushed onto the surface of a polytetrafluoroethylene tape primed in accordance with the method described in Example XI, whereby the adhesive was found to be firmly adhered to the Teflon base.

EXAMPLE XVI

An unemulsified pressure-sensitive adhesive was prepared from the following ingredients:

| | Parts by weight |
|---|---|
| Vistanex medium molecular weight 80,000—Advance Solvents & Chemical Co. | 60 |
| Heavy paraffin oil | 27 |
| Pale zinc resinate | 10.5 |
| Terpene resin (Piccolyte S-25 Pennsylvania Industrial Chemical Corp.) | 10.5 |
| Pale gum rosin | 12 |

The ingredients were compounded together in a mill and spread onto the surface of a polytetrafluoroethylene tape primed with silicone rubber in accordance with Example I to produce a high-tensile strength tape having many useful properties and applications.

What we claim is:

1. Pressure-sensitive film comprising a halogenated polyethylene backing with the surface primed with a rubber composition selected from the class consisting of natural and synthetic rubbers fused to the halogenated polyethylene, and a tacky pressure-sensitive adhesive composition firmly adherent to the fusion modified surface on one side only of the halogenated polyethylene and relatively nonadherent to the untreated surface thereof.

2. Pressure-sensitive film comprising a backing selected from the class consisting of polytrifluorochloroethylene and polytetrafluoroethylene having the surface modified with a rubber composition selected from the class consisting of natural and synthetic rubbers fused to the backing, and a tacky pressure-sensitive adhesive composition firmly adherent to the fusion modified surface on one side only of the polytrifluorochloroethylene and relatively nonadherent to the untreated surface thereof.

3. A laminated fabric comprising a halogenated polyethylene base, a modified stratum on the surface of said backing comprising a rubber composition selected from the class consisting of natural and synthetic rubbers fused into the surface of the halogenated polyethylene on one side only, and a tacky pressure-sensitive adhesive composition adhered to said fusion modified surface stratum.

4. A pressure-sensitive film comprising a halogenated polyethylene backing with a surface modified with a silicone rubber-containing composition, said composition being fused to the surface of the halogenated polyethylene on one side only, and a tacky pressure-sensitive silicone rubber composition adhered to the fusion modified surface of the halogenated polyethylene.

5. Pressure-sensitive film comprising a halogenated polyethylene backing having a coating of silicone rubber fused to one surface of the film, and a tacky pressure-sensitive silicone rubber adhesive composition firmly adherent to the fusion primed surface of the halogenated polyethylene.

6. Pressure-sensitive film comprising a halogenated polyethylene backing with one surface primed with a mixture of silicone rubber and a halogenated polyethylene fused to the surface, and a tacky pressure-sensitive silicone rubber adhesive composition firmly adhered to the fusion modified surface of the halogenated polyethylene.

7. Pressure-sensitive film comprising a halogenated polyethylene backing with one surface modified with rubber fused into the surface of the halogenated polyethylene, and a pressure-sensitive rubber composition firmly adhered to the fusion modified surface of the halogenated polyethylene.

8. Pressure-sensitive film comprising a halogenated polyethylene backing with a surface primed with synthetic rubber fused into one surface of the halogenated polyethylene backing, and a synthetic rubber pressure-sensitive adhesive composition firmly adhered to the fusion modified surface of the halogenated polyethylene.

9. Pressure-sensitive halogenated polyethylene film having one surface primed with a silicone rubber fused into the surface of the halogenated polyethylene, and a pressure-sensitive composition including a mixture of silicone rubber with silicone resin firmly adherent to the fusion modified surface of the film.

10. Pressure-sensitive halogenated polyethylene film having one surface modified with a silicone rubber containing material fused into the surface of the halogenated polyethylene, and a pressure-sensitive composition firmly adherent to the modified surface including a mixture of dimethyl silicone rubber and an oxidized silicone oil.

11. Pressure-sensitive adhesive composition comprising a mixture of dimethyl silicone rubber and oxidized dimethyl silicone oil.

12. A method of providing a halogenated polyethylene surface which comprises applying a halogenated polyethylene film having a pressure-sensitive adhesive superimposed thereon to said surface, said pressure-sensitive adhesive being essentially composed of a silicone rubber, and being adhered to one surface of the halogenated polyethylene surface through a primer of silicone rubber fused into the surface of the halogenated polyethylene.

13. A pressure-sensitive halogenated polyethylene film as set forth in claim 9, wherein the pressure-sensitive composition includes a mixture of approximately fifty percent silicone rubber and fifty percent silicone resin.

14. The method of forming a pressure-sensitive halogenated polyethylene film which comprises coating one surface of the film with a rubber composition selected from the class consisting of natural and synthetic rubbers, heating said coated surface of the film to above the fusion point of the halogenated polyethylene film to produce a modified surface thereof and applying to said fusion-modified surface a pressure-sensitive adhesive composition.

15. The method of forming a pressure-sensitive halogenated polyethylene film which comprises coating one surface of the film with a composition containing silicone rubber, heating said coated surface of the film to above the fusion point of the halogenated polyethylene film to produce a modified surface thereof and applying to the thus modified surface of the film a pressure-sensitive composition containing silicone rubber.

16. The method as set forth in claim 15 wherein the silicone rubber is a dimethyl silicone rubber.

*17. Pressure-sensitive film comprising a halogenated polyethylene backing with a surface primed with a rubber composition selected from the class consisting of natural and synthetic rubbers fused to the halogenated polyethylene, and a tacky pressure-sensitive adhesive composition firmly adherent to the fusion modified surface of the halogenated polyethylene and relatively nonadherent to a non-treated halogenated polyethylene.*

*18. Pressure-sensitive film comprising a halogenated polyethylene backing with a surface primed with a rubber composition selected from the class consisting of natural and synthetic rubbers fused to the halogenated polyethylene, and a tacky pressure-sensitive adhesive composition firmly adherent to the fusion modified surface of the halogenated polyethylene.*

References Cited in the file of this patent or the original patent

UNITED STATES PATENTS

| | | |
|---|---|---|
| 2,530,635 | Sowa | Nov. 21, 1950 |
| 2,705,691 | Panagrossi et al. | Apr. 5, 1955 |
| 2,744,079 | Kilbourne et al. | May 1, 1956 |
| 2,751,314 | Keil | June 19, 1956 |